March 10, 1970 K. O. JOHNSON ET AL 3,499,589

TAPE LOOP BIN SYSTEM AND APPARATUS

Filed Jan. 10, 1968 4 Sheets-Sheet 1

INVENTORS:
Donald J. Verrow
Keith O. Johnson
By Keith D. Beecher
ATTORNEY

TAPE LOOP BIN SYSTEM AND APPARATUS
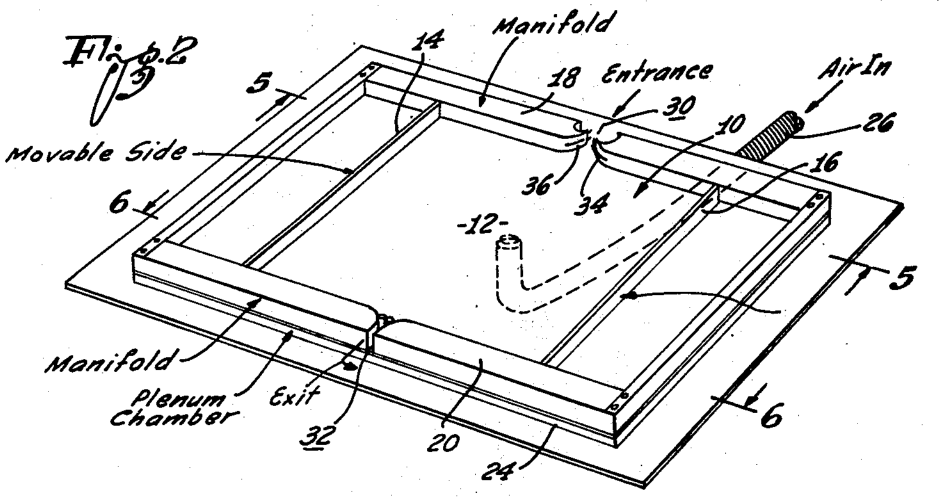
Fig. 2
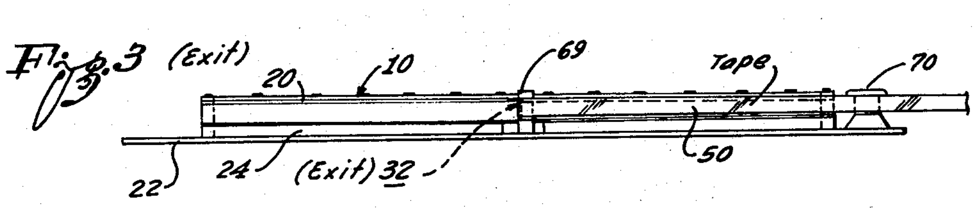
Fig. 3 (Exit)
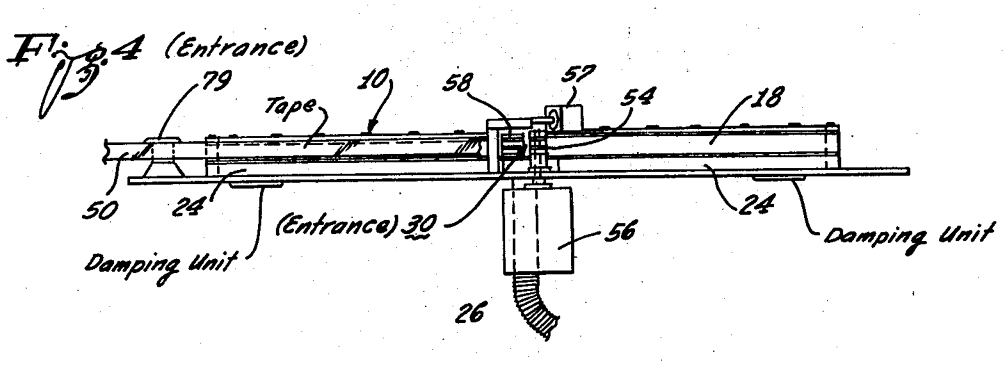
Fig. 4 (Entrance)
INVENTORS:
Donald J. Verrow
Keith O. Johnson
By Keith A. Beecher
ATTORNEY INVENTORS:
Donald J. Verrow
Keith O. Johnson
By Keith D. Beecher
ATTORNEY March 10, 1970 K. O. JOHNSON ET AL 3,499,589

TAPE LOOP BIN SYSTEM AND APPARATUS

Filed Jan. 10, 1968 4 Sheets-Sheet 4

INVENTORS:
Donald J. Verrow
Keith O. Johnson
By Keith D. Beecher
ATTORNEY

United States Patent Office 3,499,589
Patented Mar. 10, 1970

3,499,589

TAPE LOOP BIN SYSTEM AND APPARATUS

Keith O. Johnson, Los Angeles, and Donald J. Verrow, Studio City, Calif., assignors to Gauss Electrophysics, Inc., Santa Monica, Calif., a corporation of California Filed Jan. 10, 1968, Ser. No. 696,869
Int. Cl. B65h 17/32
U.S. Cl. 226—97 8 Claims

ABSTRACT OF THE DISCLOSURE

A tape loop bin system is provided in which an endless magnetic tape, or other elongated flexible tape, is drawn past usual transducer heads, and in which the major part of the tape is stored in serpentine folds in a bin or magazine. The system of the invention may be used in conjunction with magnetic recorders, data processors, or other systems requiring relatively large signal storage capabilities.

The particular system to be described herein uses a horizontal storage bin for the tape, and an especially constructed tape drive mechanism, together with pneumatic means, to permit a large quantity of tape to be stored in the bin, and to be fed into and out of the bin at a relatively high speed and for relatively long running periods.

BACKGROUND OF THE INVENTION

Endless tape systems, in which a tape recording medium is run continuously past associated transducer heads, have wide utility in many arts. Such systems have the advantage in that there is no need to interrupt the reproducing or recording process while the tape is being rewound, as is the case in the usual supply reel/take-up reel type of system.

Endless tape systems find utility, for example, in the music recording art in which a flexible master magnetic tape is used, and its information is recorded over and over again on one or more duplicate tapes. The endless tape system also finds utility in instrumentation and data processing systems, wherein the tape is run continuously past appropriate transducers to receive information from memory storage and to make the stored information repeatedly available.

As mentioned above, it is usual in such systems to store the flexible magnetic tape in serpentine folds in an appropriate bin, or magazine. However, the static electricity reactions set up by the tape, when tapes composed of insulating materials are used, create severe limitations as to maximum running times and tape speeds, and also creates tendencies for the tape to twist and break.

For example, in the usual prior art tape storage systems of the type under consideration, the maximum tape speed possible is of the order of 60–120 inches per second, with tape breakage being prevalent, and with the tape running times being limited. Also, there is a tendency in the prior art systems and apparatus for tape flutter effects to be produced, this being due to the vagaries and variations of internal electrostatic and mechanical stresses created on the tape within the bin. The tape system of the present invention, on the other hand, is capable of high speed operation up to 240–300 inches per second, for example, over unlimited running times, and with no tendencies for tape flutter or breakage.

In one prior art tape loop bin system, the storage bin is disposed in a vertical plane, and the tape is fed into the bin through the upper end wall of the bin and is withdrawn through the lower end wall of the bin. However, in this particular prior art system, the tape, by its own weight, packs down at the lower part of the bin, and this creates severe mechanical compression effects, so that violent jerking on the tape is experienced as it is drawn out of the bin for processing.

In addition, the severe electrostatic effects encountered at the upper end of the vertical bin limits the amount of tape that can be packed into the vertical bin of the prior art apparatus; and the electrostatic effects also limits the running time and speed of the tape in the vertical bin type of prior art system, as mentioned above. It should be pointed out, for example, that in the case of magnetic tape, it is usual to use a highly insulating flexible plastic material, such as Mylar, as the base. This material builds up high electrostatic charges within the tape bin, and the adjacent loops of the tape tend either to attract or repel one another with considerable force. The repelling action makes it difficult to feed the tape into the bin, and the attracting action makes it difficult to draw the tape out of the bin. These electrostatic forces can cause the tape to stick to the side of the bin, thereby creating a half twist. At high speeds this tape twist can cause severe tugging and tape breakage.

In addition to the problems discussed above, there are windage effects when it is attempted to draw the tape out of the bin quickly. Also, the static electrostatic charge build up in the prior art system, often required the system to be stopped periodically so as to permit the charge to bleed off. In many prior art systems, for example, it is necessary to stop the apparatus after a couple of hours of running time, so as to permit the electrostatic charge to drain off: and again reach an operational level. Moreover, the tape in such prior art systems and apparatus is unpredictable in that it tugs, twists and sticks to the walls and bottom of the bin, it resists any attempt to feed it into the bin or to pull it out of the bin.

Most of the prior art approaches in combating the effects of static electricity on the tape in the systems under consideration have centered around relatively fruitless attempts to provide adequate means for bleeding the static electricity from the tape. In the apparatus of the present invention, however, the structure is constructed to operate satisfactorily regardless of the build up of electrostatic charges on the tape.

SUMMARY OF THE INVENTION

The apparatus of the present invention is constructed so that the tape bin is disposed in a horizontal plane, rather than in a vertical plane. With such construction, the weight of the tape does not force the folds of tape together at the bottom of the bin, which tend to aggravate the effect of static charges on the tape in the prior art apparatus. Instead, in the embodiment of the invention to be described, the tape is supported on its lower edge by the bottom of the bin, so that there is a minimum of electrostatic reaction between the tape and the bottom of the bin. In addition, the tape is fed through the horizontal bin in a manner so that there is a substantially uniform displacement of the loops of the tape throughout the bin, with none of the loops being too close together or too wide apart. In this way, there is no tendency for the tape to stick excessively to adjacent loops, or to twist on itself and stick to the bottom or top of the bin.

The pinch roller and drive capstan of the system of the present invention are designed, as will be described, so that even in the presence of a high electrostatic charge on the tape, the tape cannot wrap itself around these elements and become entangled therein. Also, pneumatic means is used, whereby jets of air are directed against the tape at the entrance and exit slots of the bin to hold the tape away from the end walls of the bin adjacent the entrance and exit slots, and to assure that the tape will be smoothly fed into the bin and smoothly drawn out of the bin.

In the horizontal bin of the apparatus of the present invention, the tape is disposed uniformly within the bin with the adjacent folds close enough to one another to prevent the tape from twisting and sticking side-on to the bottom or top of the bin, as explained above. This problem is acute in the vertical bin type of system, in which the tape is tightly packed at the bottom of the bin, but necessarily loosely packed at the top of the bin.

The pneumatic means, whereby air jets are blown against the tape at the entrance to the bin, not only serves to hold the tape away from the wall of the bin adjacent the entrance, but also serves to cause tiny wavy loops or "burbles" to form in the tape. These tiny loops remain in the tape throughout its entire travel through the bin, and they assure that there is no snapping or whipping of the tape as it is drawn out of the bin through the exit slot. This "burbling" action assures smooth movement of the tape with minimum flutter past the associated transducer heads. The aforesaid "burbles" cause the formation of small folds in the tape, which unlike the large folds of the prior art straight or gravity feed bin, do not have a tendency to flip over and stick to the walls of the bin.

The aforesaid pneumatic means adjacent the entrance slot of the tape storage bin also aids in effectively pushing the tape folds through the bin towards the exit slot. Additional pneumatic means at the exit slot add a degree of turbulence to the tape, and prevent the tape from sticking to the end wall adjacent the exit slot, and also prevent the small folds of tape in the adjacent tape pack from emerging through the exit slot. This additional pneumatic means generally improves the operation of the system.

It is to be understood, of course, that although the improved loop tape bin storage system and apparatus of the invention will be described herein in conjunction with magnetic tape recording/reproducing apparatus; the concepts of the invention apply equally to other tape storage systems utilizing, for example, photographic film, punched tape, or any other tape system which requires smooth and continuous tape travel over a wide range of speeds.

BRIEF DESCRIPTION OF THE DRAWINGS

FIGURE 2 is a top perspective view of a tape bin included in the apparatus of FIGURE 1, with certain of the components removed to aid in the clarity of the illustration;

FIGURE 3 is an end elevation view of the apparatus of FIGURE 1 taken at the exit end thereof, and substantially along the line 3—3 of FIGURE 1;

FIGURE 4 is an end elevation view of the apparatus taken at the entrance end, and substantially along the line 4—4 of FIGURE 1;

DETAILED DESCRIPTION OF THE ILLUSTRATED EMBODIMENT

Figure 1:
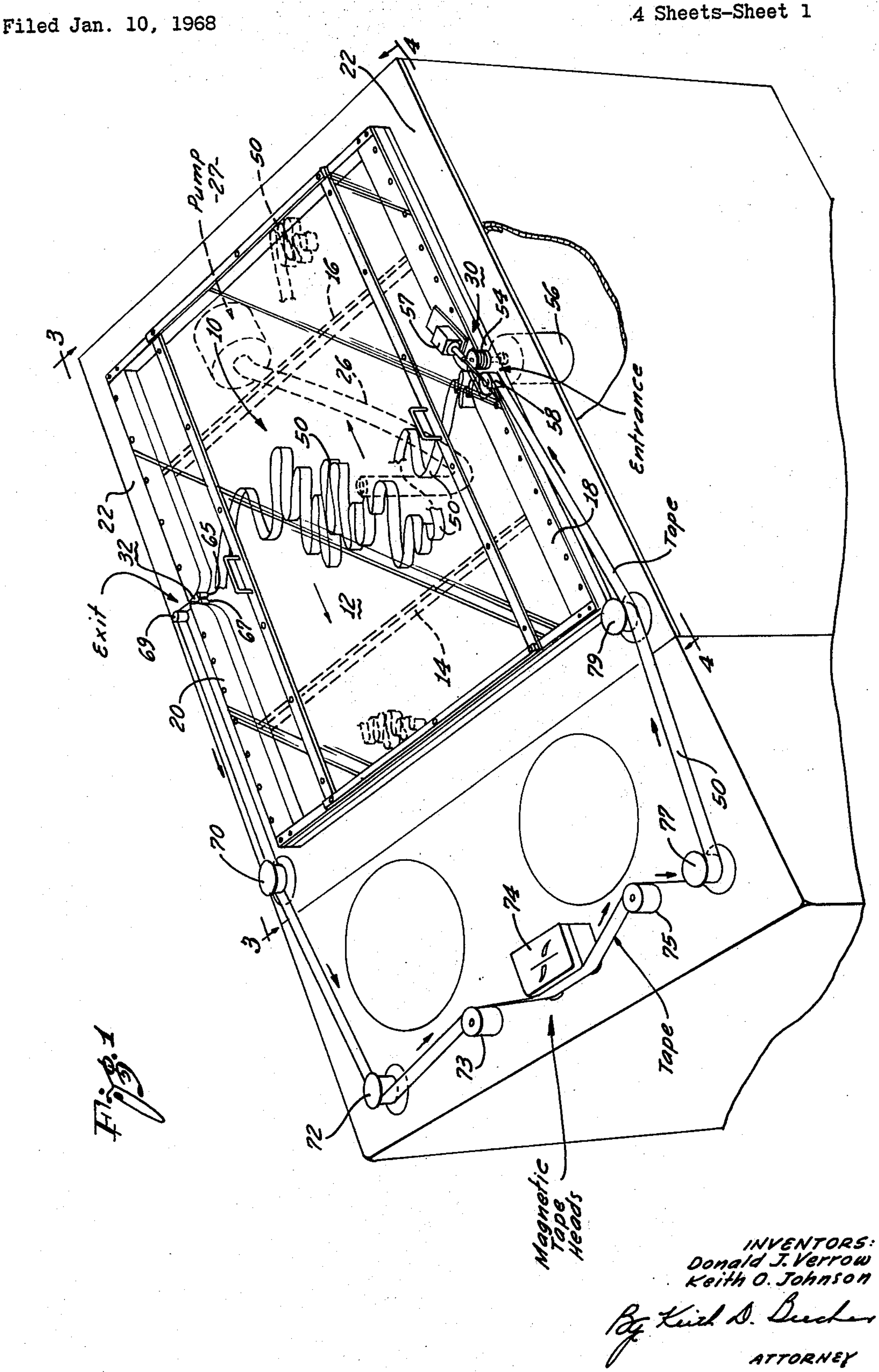
FIGURE 1 is a top perspective view of magnetic recording/reproducing tape bin storage apparatus which may be constructed to incorporate the principles of the present invention.

The apparatus of the invention as shown, for example, in FIGURES 1 and 2 includes a tape storage bin 10 which, in turn, has a bottom 12, a pair of side walls 14 and 16, and a pair of end walls 18 and 20. The bin 10 is supported on an appropriate stand 22 in a generally horizontal plane. The side walls 14 and 16 may be moved towards or away from the center of the bin to accommodate different quantities of tape, and they may be removed when the full capacity of the bin is to be used.

A plenum chamber 24 is formed under the bin 12, and air is introduced under pressure to the plenum chamber 24 through an inlet line 26 from an appropriate blower pump 27, or other source of pressurized fluid. The end walls 18 and 20 are formed to encompass manifolds 19 and 21 positioned over the plenum chamber 24, and having apertures extending through the bottom 12 communicating with the plenum chamber 24.

Figure 5:
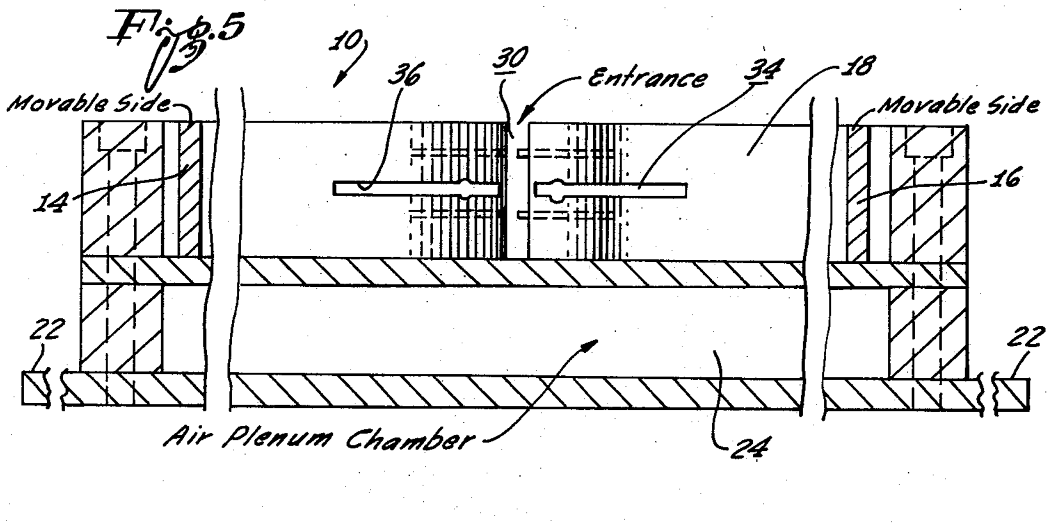
FIGURE 5 is an internal view of the entrance end wall of the apparatus taken essentially along the line 5—5 of FIGURE 2.
Figure 6:
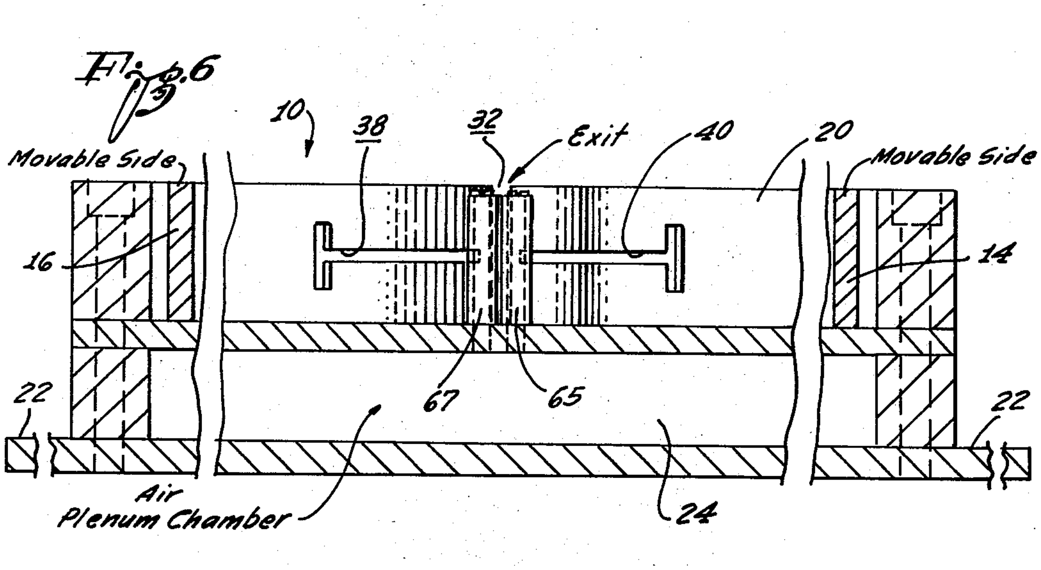
FIGURE 6 is an internal view of the exit wall taken essentially along the line 6—6 of FIGURE 2.

As best shown in FIGURES 4 and 5, the end wall 18 has a central slot 30 which constitutes an entrance slot for the tape, and the end wall has a curved configuration on each side of the entrance slot. Likewise, as best shown in FIGURES 3 and 6, the end wall 20 has a slot 32 which constitutes the exit slot for the bin 10, and the end wall has a curved configuration on each side of the exit slot.

A pair of elongated horizontal slots 34 and 36 are formed on the inner side of the end wall 18 in communication with the manifold 19 formed within the end wall. These slots 34 and 36 extend around the curved portion of the end wall 18 on either side of the entrance slot 30, and they have round holes therein, in the constructed embodiment, as more clearly shown, for example, in FIGURE 5. The end wall 20 also has slots formed in the curved portion thereof on either side of the exit slot 32 extending into the manifold 21, the slots being designated 38 and 40 in FIGURE 6, and having a somewhat different configuration in the constructed embodiment from the slots in the end wall 18 of FIGURE 5.

Figures 7, 8, 9:
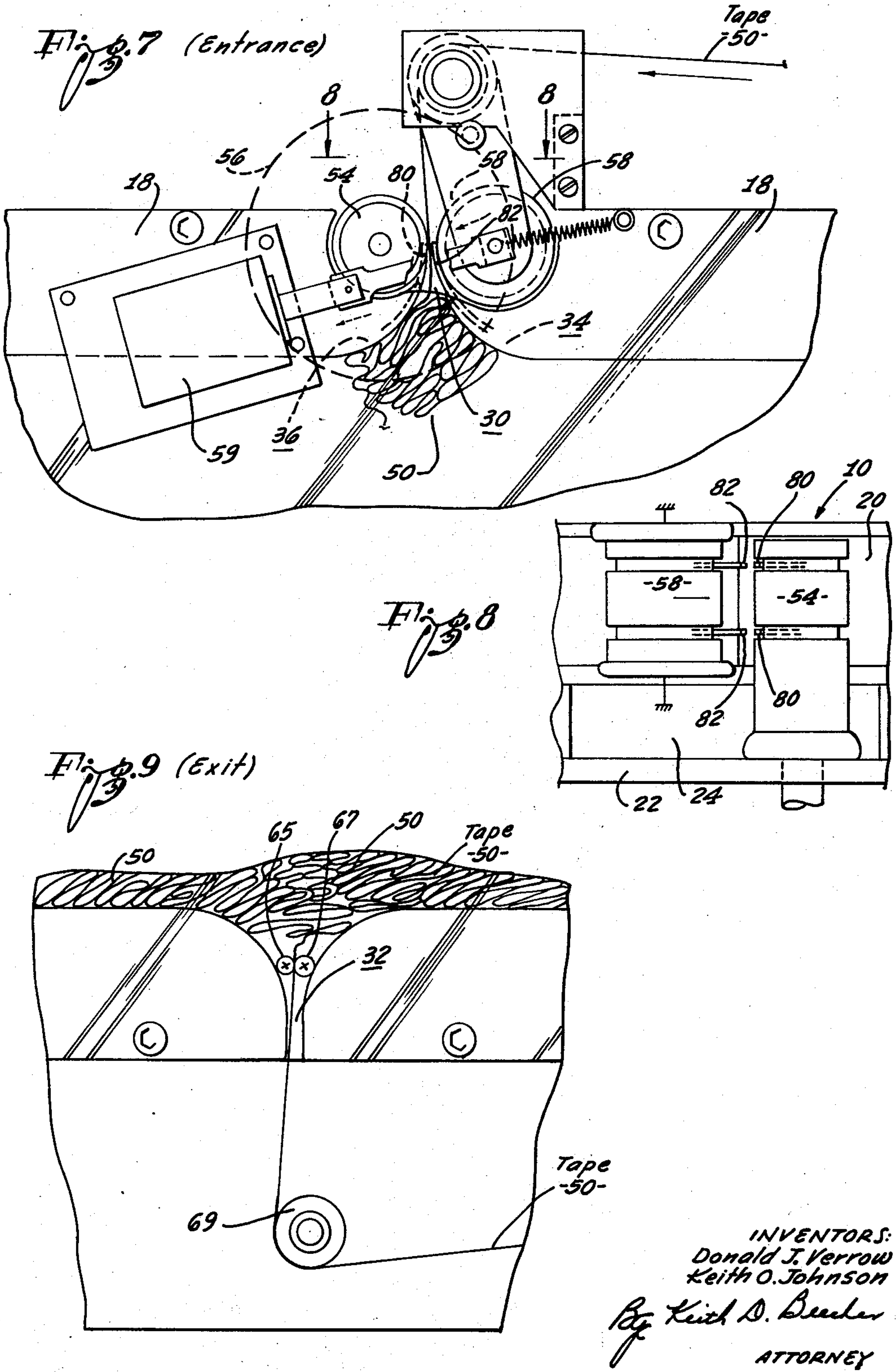
FIGURE 7 is an enlarged fragmentary plan view of the portion of the entrance wall adjacent the entrance slot, and showing a capstan drive/idler wheel combination for feeding the tape into the drum.
FIGURE 8 is a side view essentially along the line 8—8 of FIGURE 7.
FIGURE 9 is an enlarged fragmentary plan view of the portion of the exit wall adjacent the exit slot and the associated components.

As shown in FIGURES 1, 7 and 8, for example, the tape 50 is fed into the bin 10 through the entrance slot 30 by means of a capstan drive sprocket 54. The capstan drive sprocket 54 is driven, for example, by means of an electric motor 56. An idler roller 58 is selectively moved by a solenoid 59 against the capstan sprocket 54 to press the tape against the sprocket and cause it to be fed into the bin. The tape is drawn through the exit slot 32 through a pair of guide rollers 65 and 67 (FIGURE 9), and around an idler 69.

As shown in FIGURE 1, the tape 50 is drawn out of the exit port 32 and around the idler roller 69 and a further idler roller 70. The tape may then be drawn around the idler 72 and around a guide post 73 across a magnetic transducer unit 74. The unit 74 may include the various electro-magnetic record and reproduce heads. The tape then passes around a guide post 75 and idlers 77 and 79 to the capstan 54.

As best shown in FIGURES 7 and 8, the capstan 54 and the idler roller 58 each have a plurality of spaced parallel peripheral grooves formed therein. A pair of guide combs 80 and 82 have separate fingers which extend into the grooves. The tape 50 passes between the guides, so that it is impossible for the tape to wrap itself around the capstan 54 or around the idler 58.

The invention provides, therefore, an improved tape bin storage system which is constructed so that, as the tape is fed into the bin 10 by the capstan 54, the air jets emitted through the slots 34 and 36 hold the tape away from the wall 18 adjacent the entrance slot 30. These air jets also produce wavy loops in the tape, and drive the tape loops through the chamber towards the exit slot 32, as described above.

The similar air jets at the exit slot 32 also serve to enable the tape to be drawn out through the slot 32 without violent jerking or other movements which would otherwise produce flutter as the tape passes the transducer heads in the unit 74.

What is claimed is:

1. A loop bin storage apparatus for an elongated flexible tape, including: a storage bin in which the tape is stored in an upright folded condition, said bin including a bottom plate for supporting the tape with the lower edge of the tape resting on said bottom plate, and said bin further including a first wall at one end thereof and a second wall as the other end thereof, said first wall defining an entrance slot and said second wall defining an exit slot, and pneumatic means including a manifold contained within said first wall for causing fluid jets to be emitted from said first wall adjacent said entrance slot to prevent the tape from engaging said first wall at said entrance slot and to assist in the feed of tape into the bin, said first wall being curved on each side of said entrance slot and having openings therein adjacent said entrance slot for said fluid jets.

2. The loop bin storage apparatus defined in claim 1, and which includes means supporting said loop bin in a generally horizontal plane.

3. The loop bin storage apparatus defined in claim 1, in which said openings are horizontal elongated slots in the curved portion of said first wall on each side of said entrance slot.

4. The loop bin storage apparatus defined in claim 1, and which includes further pneumatic means for causing fluid jets to be emitted adjacent said exit slot to assist the withdrawal of tape out of the bin.

5. The loop bin storage apparatus defined in claim 4, in which said further pneumatic means includes a manifold contained within said second wall, said second wall being curved on each side of said exit slot and having further apertures therein adjacent said exit slot for said last-named fluid jets.

6. The loop bin storage apparatus defined in claim 5, in which said further apertures are horizontal slots in the curved portion of said second wall on each side of said exit slot.

7. The loop bin storage apparatus defined in claim 1, and which includes a capstan drive sprocket mounted externally of said bin adjacent said entrance slot, and an idler roller for pressing the tape against said sprocket.

8. The loop bin storage apparatus defined in claim 7, in which said capstan drive sprocket and said idler roller each have a plurality of spaced and parallel peripheral grooves therein, and which includes spaced and parallel guides for said tape extending from said entrance slot and into said grooves.

References Cited

UNITED STATES PATENTS

| | | | |
|---|---|---|---|
| 2,348,355 | 5/1944 | Miller | 226—118X |
| 2,962,200 | 11/1960 | Pouliart | 226—97X |
| 2,995,313 | 8/1961 | Namenyi-Katz | 226—119X |
| 3,021,989 | 2/1962 | Sellers | 226—118 |
| 3,180,547 | 4/1965 | Gruczelak | 226—118 |

RICHARD A. SCHACHER, Primary Examiner

U.S. Cl. X.R.

226—118